(12) United States Patent
Vasantham et al.

(10) Patent No.: US 9,165,278 B2
(45) Date of Patent: Oct. 20, 2015

(54) INVENTORY AVAILABILITY

(71) Applicant: Wal-Mart Stores, Inc., Bentonville, AR (US)

(72) Inventors: Madhavan Kandhadai Vasantham, Foster City, CA (US); Vikrant Tare, Foster City, CA (US); Sreekanth Sreedhararaj, Foster City, CA (US); Mahesh Tyagarajan, San Jose, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 7 days.

(21) Appl. No.: 13/907,309

(22) Filed: May 31, 2013

(65) Prior Publication Data
US 2014/0358739 A1    Dec. 4, 2014

(51) Int. Cl.
*G06Q 10/08* (2012.01)

(52) U.S. Cl.
CPC ............ *G06Q 10/087* (2013.01); *H05K 999/00* (2013.01)

(58) Field of Classification Search
CPC .................................................. G06Q 10/087
USPC ......................................................... 705/28
See application file for complete search history.

(56) References Cited

U.S. PATENT DOCUMENTS

| | | | |
|---|---|---|---|
| 6,434,530 B1 | 8/2002 | Sloane | |
| 7,063,263 B2 | 6/2006 | Swartz | |
| 7,580,699 B1 | 8/2009 | Shaw | |
| 7,904,975 B2 | 3/2011 | Kruglikov | |
| 7,930,416 B2 | 4/2011 | Miller | |
| 8,170,915 B2 | 5/2012 | Borders | |
| 8,219,558 B1 | 7/2012 | Trandal | |
| 8,311,901 B1 | 11/2012 | Carmichael | |
| 8,386,323 B1 * | 2/2013 | Chenault et al. | 705/22 |
| 9,031,891 B2 * | 5/2015 | Lataille et al. | 706/47 |
| 2006/0095434 A1 * | 5/2006 | McCullough et al. | 707/10 |
| 2008/0235225 A1 * | 9/2008 | Michele et al. | 707/6 |
| 2010/0179877 A1 | 7/2010 | Lam | |
| 2014/0201041 A1 * | 7/2014 | Meyer | 705/28 |

OTHER PUBLICATIONS

An online headache. (2001). Pharmaceutical Technology Europe, 13(8), 12. Retrieved from http://search.proquest.com/docview/211375742?accountid=14753.*

Specialized bicycles speeds to E-business success with complete oracle(R) solution. (Mar. 26, 2001). PR Newswire Retrieved from http://search.proquest.com/docview/444058658?accountid=14753.*

* cited by examiner

*Primary Examiner* — Scott Zare

(74) *Attorney, Agent, or Firm* — Bryan Cave LLP

(57) ABSTRACT

The present disclosure extends to maintaining an item inventory status at an inventory cache management system. The inventory cache may be refreshed regularly by a threshold-based triggering mechanism. In embodiments, as item inventory breaches certain thresholds, the inventory cache may be refreshed with increased frequency to mitigate overselling or underselling scenarios and reduce overall network traffic for items having relatively high inventory levels.

20 Claims, 2 Drawing Sheets

INVENTORY AVAILABILITY

BACKGROUND

An inventory availability tracking system is typically an important component of a merchant site. As used in the present disclosure, the term "merchant site" may refer to an e-commerce site, an m-commerce site, a store kiosk, or other types of sales operations. Generally, an inventory management system may include functionality to track current inventory levels of one or more products offered for sale at a merchant site. Overselling or underselling are undesirable scenarios that could occur in cases where inventory availability tracking in a merchant site is unclear or unreliable.

Updating an item inventory at a front end web or app server on a real-time basis may be a resource-intensive process as it typically may involve: a complex backend algorithm to determine the accurate availability and delivery date of an item in a most optimal and expedited fashion; network delays (from the web/app server to back end systems and/or databases); additional access restrictions like authentication and authorization processes, protocol termination, acceleration, encryption, and decryption; and raw data access and additional processing.

Fast page creation and delivery to consumers may be important because as page load times increase, consumers may be increasingly more likely to abandon the page. Accordingly, slow page loading times on a merchant site may directly decrease overall sales and profitability.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
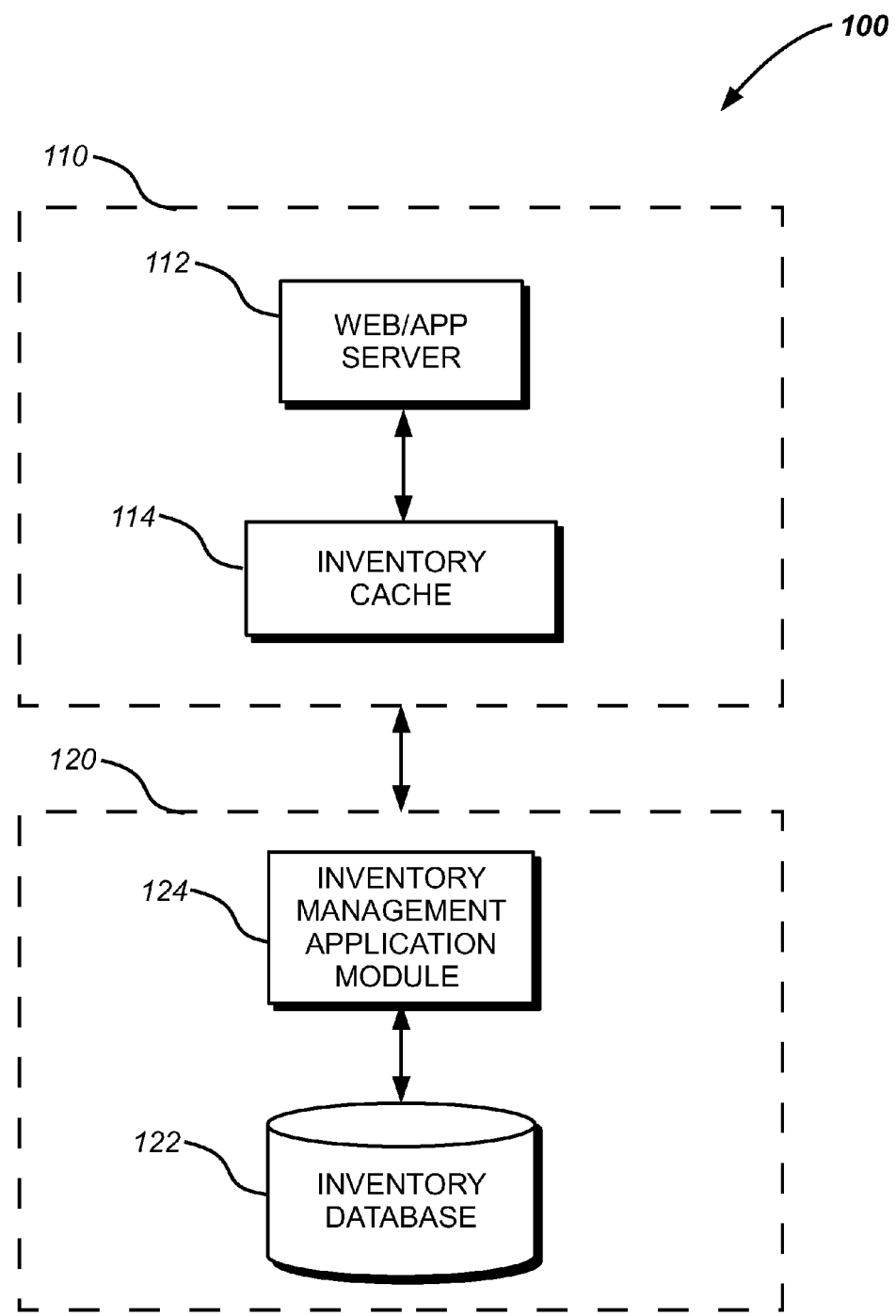
FIG. 1 is a block diagram illustrating components of an inventory cache management system according to an embodiment of the present disclosure and FIG. 2 is a chart illustrating an example method for updating an inventory cache management system in accordance with embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for updating and/or maintaining item inventory levels in an inventory cache. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure are directed to updating item inventory levels in an inventory cache management system. According to embodiments disclosed herein, an item inventory availability status may be maintained in an inventory cache layer. Embodiments of the present system may mitigate delays associated with present item inventory systems by intelligently storing the inventory visibility in the inventory cache as will be described in detail.

As used in the present disclosure, an "item" may refer to a product that is offered for sale and/or sold by a merchant. Such products may include, but are not limited to: groceries, foods, office supplies, clothing wares, any other fungible goods sold by a retailer, commercial products, industrial goods, and the like. A merchant may typically operate and manage the systems disclosed and described herein or may enter into service agreements with a third party to operate and manage the systems.

Referring now to FIG. 1, embodiments of inventory cache management system 100 of the present disclosure comprises web/app server 112, inventory cache 114, inventory database 122, and inventory management application module 124. Inventory cache management system 100, web/app server 112, inventory cache 114, inventory database 122, and/or inventory management application module 124 may refer to one or more servers or other types of computing devices that operate in an individual or distributed manner as will be described in detail below. In embodiments, web/app server 112 and inventory cache 114 may be referred to as the front end 110 of system 100. In embodiments, inventory database 122 and inventory management application module 124 may be referred to as the inventory management system 120 of inventory cache management system 100.

In embodiments, web/app server 112 is adapted to transmit a graphical user interface to users. The graphical user interface may comprise an e-commerce webpage. In embodiments, the graphical user interface is embodied in a webpage that is encoded in a markup language such as HTML and may be transmitted to a user computing device for display to the user. In embodiments, the graphical user interface includes an item inventory status reflecting current stock levels of the item in the merchant's inventory. Web/app server 112 can query inventory cache 114 for a current inventory status for any particular item. The graphical user interface may be transmitted in a file via a communication network, such as the Internet, from web/app server 112 to the user computing device.

In embodiments, inventory cache 114 is adapted to receive and store the inventory status for one or more items. Typically, such items are offered for sale on the merchant's website via the graphical user interface provided by web/app server 112. Inventory cache 114 can periodically receive an item's inventory status from inventory database 122 via inventory management application module 124 as will be described in further detail. As inventory cache 114 receives each inventory status update from inventory management application module 124, the current inventory status update is stored within a memory unit of inventory cache 114. In embodiments, the memory unit of inventory cache 114 comprises any type of computer-readable media that provides a satisfactorily quick response to web/app server 112.

In embodiments, inventory database 122 is adapted to maintain an inventory quantity for one or more items. The inventory quantity may typically reflect an in-stock and available-to-ship inventory of each item offered for sale by merchant. Inventory database 122 is adapted to receive transaction updates from a transaction processing system in order to update inventory levels to reflect sales transactions.

In embodiments, inventory management application module 124 is adapted to monitor inventory levels stored at inventory database 122 for one or more items and compare the inventory levels to predetermined thresholds for the item. Following business rules that will be described in additional detail, inventory management application module 124 transmits alerts to inventory cache 114 to reflect actual inventory levels for each item.

In embodiments of the present disclosure, web/app server 112, inventory cache 114, inventory database 122, and inventory management application module 124 may transmit signals amongst each other via any type of communication network including, but not limited to, a wireless network, a cellular network, an intranet, the Internet, or combinations thereof.

In operation, inventory cache 114 maintains an item inventory availability status for each item. Inventory cache 114 can be refreshed regularly from data stored in inventory database 122 by inventory management application module 124 using a threshold-based triggering mechanism. Thresholds may be created by the merchant to direct how often inventory cache 114 is updated with inventory data from inventory database 122. In one example embodiment of the present disclosure, an item inventory status relative to either a "high" inventory threshold or a "medium" inventory threshold may be conveyed to inventory cache 114 from inventory database 122. For example, for a particular item, a high threshold may be set at 40 items and a medium threshold may be set at 20 items. While the inventory level of that item, as maintained in inventory database 122, remains at or above the high threshold, inventory cache 114 stores and reports that the item is "in-stock." As sales transactions are completed, the inventory level of the item may be updated at inventory database 122 to reflect the actual in-stock quantity of the item. However, in embodiments, an inventory status signal is not transmitted from inventory database 122 to inventory cache 114 for each transaction while the inventory level remains at or above the high threshold. If the inventory level of the item, as recorded and maintained in inventory database 122, drops below the high threshold, inventory management application module 124 can transmit a signal to inventory cache 114 to update the new inventory status at inventory cache 114 accordingly. Such a signal may be referred to herein as a "Limited Stock Alert." A Limited Stock Alert may include an item identification code and the updated inventory quantity of the item. In embodiments, a Limited Stock Alert is transmitted by inventory management application module 124 to inventory cache 114 for every supply and demand change in inventory database 122 while the inventory level remains below the high threshold. For example, a Limited Stock Alert may be triggered by each sale of an item having an inventory level below the high threshold.

For example, upon completion of each sale transaction subsequent to a breach of the high threshold, inventory management application module 124 can transmit a Limited Stock Alert to inventory cache 114 containing the updated inventory quantity of the relevant item. In alternative embodiments, inventory management application module 124 can transmit a Limited Stock Alert to inventory cache 114 on a periodic repeating basis after the high threshold was breached. In embodiments, inventory management application module 124 may be selectively configured to transmit Limited Stock Alerts at predetermined intervals, upon certain conditions such as every transaction completion, completion of a set number of transactions, or upon satisfaction of other circumstances.

In embodiments, while the inventory level of an item, as maintained in inventory database 122, remains below the high threshold but above the medium threshold, inventory cache 114 stores and reports that the item is "limited." As sales transactions are completed, the inventory level of the item may be updated at inventory database 122 to reflect the actual in-stock quantity of the item. While the inventory status of the item remains limited, an inventory status signal may be transmitted from inventory database 122 to inventory cache 114 upon each transaction completion while the inventory level remains below the high threshold. If the inventory level of the item, as recorded and maintained in inventory database 122, drops below the medium threshold, inventory management application module 124 can transmit a signal to inventory cache 114 to update the new inventory status at inventory cache 114 accordingly. Such a signal may be referred to herein as an "Out of Stock Alert." An Out of Stock Alert may include an item identification code and the updated inventory quantity of the item. In embodiments, an Out of Stock Alert is transmitted by inventory management application module 124 to inventory cache 114 for every supply and demand change in inventory database 122 while the inventory level remains below the medium threshold. Alternatively, an Out of Stock Alert may be transmitted at predetermined times or upon meeting certain criteria, such as specific inventory levels at inventory database 122. A medium threshold may be selectively established to provide a safety stock level to act as a cushion and safeguard against backorders and possible order cancellation.

In operation, web/app server 112 can query inventory cache 114 for an item inventory status and produce an item inventory status for display at a user computing device. Web/app server 112 may query inventory cache 114 and produce an item e-commerce page in response to a user shopping action. For example, a user may request to see details of an item on an e-commerce website, mobile application, or other commerce platform. Web/app server 112 is adapted to transmit, to the user's computing device, information related to the item. Such information may include a current inventory status of the item. In embodiments of the present disclosure, if the inventory level of the item is at or above the high threshold, web/app server 112 may report the item inventory status as "available" to the user. If the inventory status level is below the high threshold but at or above the medium threshold, web/app server 112 may report the item inventory status as "limited" to the user. If the inventory status level is below the medium threshold, web/app server 112 may report the item inventory status as "out of stock" to the user.

Figure 2:
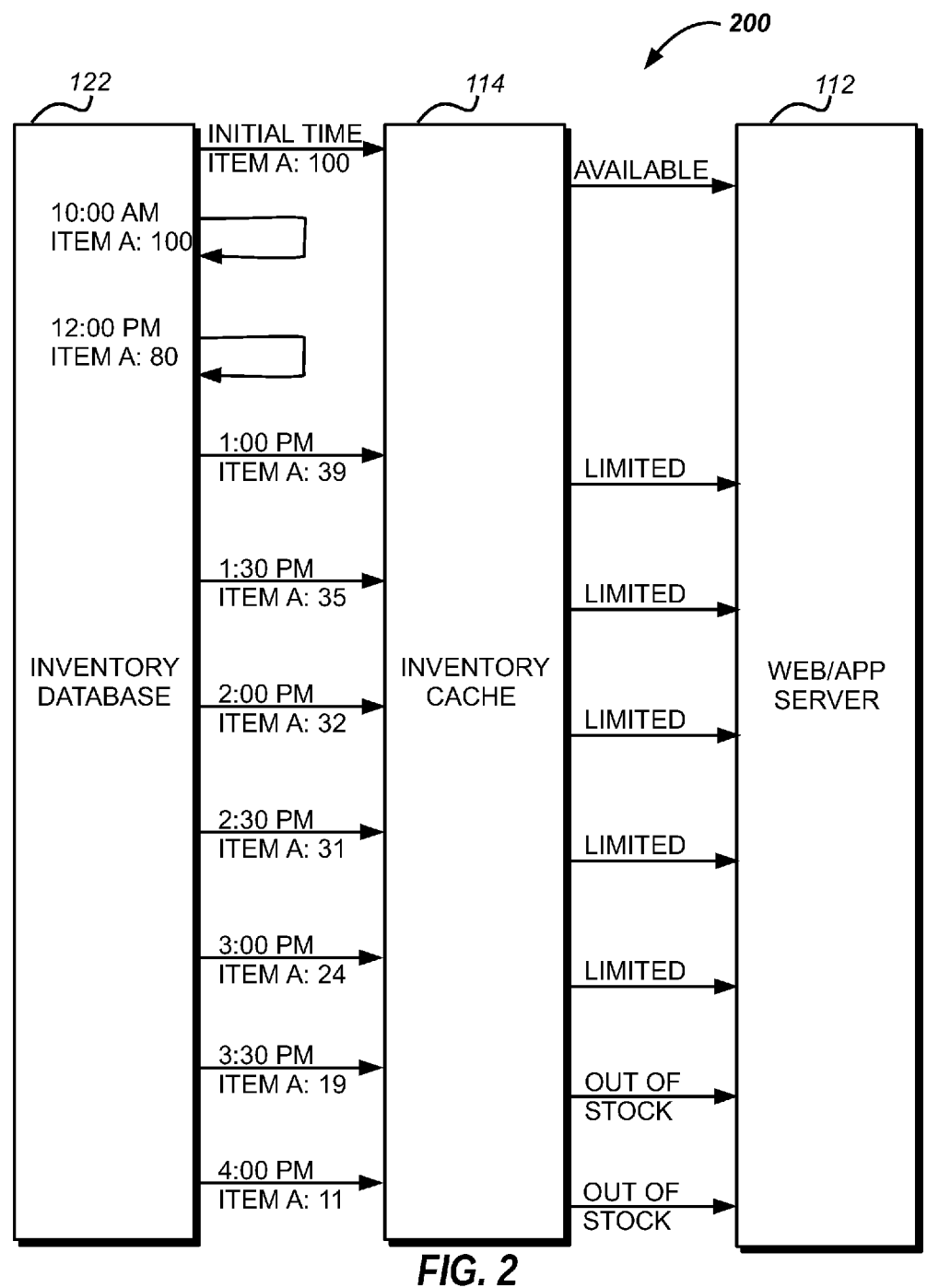

Referring now to FIG. 2, an example application 200 of the foregoing operations is depicted. FIG. 2 illustrates a series of signal transmissions from inventory management application module 124 to inventory cache 114 and from inventory cache 114 to web/app server 112 according to embodiments of the present disclosure. Such signal transmissions may relate to inventory levels of an item referred to as "Item A" in FIG. 2. As FIG. 2 illustrates, inventory management application module 124 initially reports to inventory cache 114 an inventory quantity of 100 for Item A. Accordingly, inventory cache 114 reports an inventory status for Item A of "available" to web/app server 112. Subsequent sales may cause inventory database 122 to reduce the inventory level of Item A from 100 (at 10:00 AM) to 80 (at 12:00 PM). However, because the inventory level remains above the high threshold of 40, additional inventory level signals are not transmitted to inventory cache 114. Withholding such inventory level signals may reduce network traffic between inventory management application module 124 and inventory cache 114 while still maintaining adequately accurate inventory information closer to the web/app server 112 for quicker access. While inventory cache 114 receives no further inventory level signals, inventory cache 114 continues to report an inventory status of "available" to web/app server 112.

After the high threshold has been breached, inventory management application module 124 transmits a Limited Stock Alert to inventory cache 114, reflecting that the inventory level of Item A is now below the high threshold for that item. In the example depicted in FIG. 2, the first Limited Stock Alert is transmitted at 1:00 PM and indicates the actual current inventory level of Item A. At 30 minute intervals following the first Limited Stock Alert transmission, inventory management application module 124 transmits additional Limited Stock Alerts that reflect updated inventory levels of Item A as sales continue. Such Limited Stock Alerts are made at 1:30 PM, 2:00 PM, 2:30 PM, and 3:00 PM. In alternative embodiments, Limited Stock Alerts are transmitted by inventory management application module 124 upon each transaction completion. In other embodiments, Limited Stock Alerts are transmitted by inventory management application module 124 at other time periods. As inventory cache 114 receives Limited Stock Alerts, the updated inventory status of Item A is made available to web/app server 112 to display the "limited" inventory status to users.

Upon the inventory level breaching the medium threshold of 20 items, an Out of Stock Alert is transmitted by inventory management application module 124 to inventory cache 114 at 3:30 PM. The Out of Stock Alert includes the current inventory level of Item A. An additional Out of Stock Alert is transmitted by inventory management application module 124 to inventory cache 114 at 4:00 PM. Inventory cache 114 makes the updated inventory status of "out of stock" for Item A available to web/app server 112. In embodiments, web/app server 112 may cease sales activity of an item that has been reported out of stock until the inventory has been replenished above the medium threshold.

In embodiments, the high and medium thresholds of any particular item may be selected based on current factors such as total beginning inventory, expected transaction rate, expected computer network congestion and/or system latency, and other relevant factors.

In alternative embodiments, inventory management system 120 can determine future availability of inventory by tracking items that are out of stock or in limited availability, but that will become available in the relatively near future. For example, inventory at a warehouse dock waiting to be received into the warehouse or inventory in transit may be referred to as future inventory. In such embodiments, system 100 may allow an order to be placed against the future inventory, thereby reducing sales lost due to backordered items.

As will be understood by one of ordinary skill in the art having the benefit of this disclosure, inventory cache management system 100 may present advantages over current common practices. For example, by selectively setting the high and medium thresholds for any particular item to meet specific circumstances, inventory cache management system 100 may avoid displaying incorrect availability information at the graphical user interface. Accurate availability information may lower the chance for overselling or underselling an item. Accurate availability information may also reduce order cancellations due to backordered items. Because inventory cache management system 100 may reduce activity and network communications while items are above their high thresholds, and because an inventory status is maintained at the front end 110, additional advantages of system 100 may include faster response times for availability inquiries, reduced network delay between inventory cache 114 and web/app server 112 during availability requests, and lower CPU utilization. Generally, faster page loads may have a significant effect on sales and/or conversion rates.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of updating an inventory cache management system, comprising:
   at an inventory management application module, receiving an item inventory level quantity;
   storing the item inventory level quantity at an inventory database;
   at the inventory management application module, comparing the item inventory level quantity with a predetermined high threshold;
   determining that the item inventory level quantity is less than the predetermined high threshold;
   while the item inventory level quantity is less than the predetermined high threshold, transmitting a first Limited Stock Alert and the item inventory level quantity from the inventory management application module to an inventory cache;
   while the item inventory level quantity is less than the predetermined high threshold, transmitting a subsequent Limited Stock Alert from the inventory management application module to the inventory cache, the subsequent Limited Stock Alert is transmitted at a predetermined time interval after transmitting the first Limited Stock Alert and the subsequent Limited Stock Alert is retransmitted at the predetermined time interval while the item inventory level quantity is less than the predetermined high threshold;
   at the inventory cache, storing an inventory status corresponding to the item inventory level quantity; and
   from the inventory cache, transmitting the inventory status to a web/app server.

2. The method of claim 1, further comprising:
   from the web/app server, transmitting the inventory status for display at a user computing device.

3. The method of claim 1, further comprising:
   at the inventory management application module, comparing the item inventory level quantity with a medium threshold less than the predetermined high threshold; and
   if the item inventory level quantity is less than the medium threshold, transmitting an Out of Stock Alert from the inventory management application module to the inventory cache.

4. The method of claim 1, wherein the subsequent Limited Stock Alert is transmitted upon completion of each one of at least one subsequent transaction while the item inventory level quantity is less than the predetermined high threshold.

5. The method of claim 1, further comprising while the item inventory level quantity is greater than or equal to the predetermined high threshold, transmitting an in-stock status signal from the inventory management application module to the inventory cache.

6. The method of claim 5, wherein transmitting the in-stock status signal from the inventory management application module to the inventory cache comprises:
   transmitting the in-stock status signal without transmitting the item inventory level quantity from the inventory management application module to the inventory cache.

7. The method of claim 1, wherein:
   the predetermined time interval comprises approximately 30 minutes.

8. A computer-implemented method of maintaining an item inventory system comprising:
   at an inventory management application module, setting a high threshold for an inventory item;
   at the inventory management application module, receiving a transaction confirmation completion;
   at an inventory database, updating an item inventory level;
   at the inventory management application module, comparing the item inventory level to the high threshold;
   determining that the item inventory level is less than the high threshold;
   while the item inventory level is equal to or less than the high threshold, transmitting a first Limited Stock Alert and the item inventory level from the inventory management application module to an inventory cache;
   while the item inventory level is equal to or less than the high threshold, transmitting a subsequent Limited Stock Alert from the inventory management application module to the inventory cache, the subsequent Limited Stock Alert is transmitted at a predetermined time interval after transmitting the first Limited Stock Alert and the subsequent Limited Stock Alert is retransmitted at the predetermined time interval while the item inventory level is less than the high threshold; and
   at the inventory cache, saving an inventory status.

9. The method of claim 8, further comprising:
   from the inventory cache, transmitting the inventory status to a web/app server.

10. The method of claim 9, further comprising:
    from the web/app server, transmitting the inventory status for display at a user computing device.

11. The method of claim 8, wherein transmitting the first Limited Stock Alert from the inventory management application module to the inventory cache comprises:
    transmitting the item inventory level to the inventory cache.

12. The method of claim 8, further comprising:
    at the inventory management application module, comparing the item inventory level with a predetermined medium threshold; and if the item inventory level is less than the predetermined medium threshold, transmitting an Out of Stock Alert from the inventory management application module to the inventory cache.

13. The method of claim 8, further comprising while the item inventory level is greater than the high threshold, transmitting an in-stock status signal from the inventory management application module to the inventory cache.

14. The method of claim 13, wherein transmitting the in-stock status signal from the inventory management application module to the inventory cache further comprises:
transmitting the in-stock status signal without transmitting the item inventory level from the inventory management application module to the inventory cache.

15. The method of claim 8, wherein:
the predetermined time interval comprises approximately 30 minutes.

16. An inventory cache management system comprising:
an inventory cache, adapted to:
  receive an inventory level quantity for at least one item; and
  transmit an inventory status for the at least one item to a web/app server;
the web/app server, adapted to transmit a graphical user interface object to a user, the graphical user interface object comprising the inventory status;
an inventory database, adapted to store the inventory level quantity; and
an inventory management application module, adapted to:
  compare the inventory level quantity to a predetermined high threshold;
  determine that the inventory level quantity is less than the predetermined high threshold;
  while the inventory level quantity is less than the predetermined high threshold, transmit a first Limited Stock Alert and the inventory level quantity to the inventory cache; and
  while the inventory level quantity is less than the predetermined high threshold, transmitting a subsequent Limited Stock Alert from the inventory management application module to the inventory cache, the subsequent Limited Stock Alert is transmitted at a predetermined time interval after transmitting the first Limited Stock Alert and the subsequent Limited Stock Alert is retransmitted at the predetermined time interval while the inventory level quantity is less than the predetermined high threshold.

17. The system of claim 16, wherein the inventory management application module is further adapted to:
  compare the inventory level quantity to a predetermined medium threshold; and
  if the inventory level quantity is less than the predetermined medium threshold, transmit an Out of Stock Alert to the inventory cache.

18. The system of claim 16, wherein the inventory management application module is further adapted to:
  while the inventory level quantity is greater than or equal to the predetermined high threshold, transmit an in-stock status signal to the inventory cache.

19. The system of claim 18, wherein the inventory management application module is further adapted to:
  while the inventory level quantity is greater than or equal to the predetermined high threshold, transmit the in-stock status signal without transmitting the inventory level quantity to the inventory cache.

20. The system of claim 16, wherein:
the predetermined time interval comprises approximately 30 minutes.

* * * * *